(12) United States Patent
Ramakrishnan

(10) Patent No.: US 10,557,346 B2
(45) Date of Patent: Feb. 11, 2020

(54) METHODS FOR DETERMINING SATURATION PARAMETERS OF A FORMATION

(71) Applicant: SCHLUMBERGER TECHNOLGOY CORPORATION, Sugar Land, TX (US)

(72) Inventor: Terizhandur S. Ramakrishnan, Boxborough, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 560 days.

(21) Appl. No.: 15/095,821

(22) Filed: Apr. 11, 2016

(65) Prior Publication Data

US 2017/0292377 A1   Oct. 12, 2017

(51) Int. Cl.
*E21B 49/08* (2006.01)
*G01F 5/00* (2006.01)

(52) U.S. Cl.
CPC ............ *E21B 49/081* (2013.01); *E21B 49/08* (2013.01); *G01F 5/00* (2013.01); *E21B 2049/085* (2013.01)

(58) Field of Classification Search
CPC .. E21B 49/08; E21B 2049/085; E21B 49/081; G01F 5/00
See application file for complete search history.

(56) References Cited

U.S. PATENT DOCUMENTS

| | | | | |
|---|---|---|---|---|
| 5,269,180 A | * | 12/1993 | Dave | ............... E21B 33/1246 166/250.02 |
| 2011/0061439 A1 | * | 3/2011 | Dong | .................. E21B 49/08 73/1.03 |
| 2012/0024523 A1 | * | 2/2012 | Ayan | ............... E21B 33/1243 166/250.15 |

OTHER PUBLICATIONS

Ramakrishnan, T.S, et al., "Water-Cut and Fractional-Flow Logs From Array-Induction Measurements", SPE Reservoir Eval. & Eng, vol. 2, Feb. 1999, pp. 85-94.
Hammond, P.S., "One-and Two-Phase Flow During Fluid Sampling by a Wireline Tool", Trans. in Porous Media 6:(1999) 299-330.
Ramakrishnan, T.S et al., "A Laboratory Investigation of Permeability in Hemispherical Flow With Application to Formation Teters", SPE Formation Evaluation, Jun. 1995, pp. 99-108.

(Continued)

*Primary Examiner* — Daniel S Larkin
*Assistant Examiner* — Anthony W Megna Fuentes

(57) ABSTRACT

Methods are provided for determining saturation parameters of a formation while sampling the formation. Flow rate and pressure data may be used in order to provide mobility information close to the probe. In turn, the mobility information may be used in conjunction with at least water fraction information in order to provide an estimation of saturation parameters of the formation such as maximum residual oil saturation $S_{orm}$, connate water saturation $S_{wc}$, and residual water saturation $S_{wr}$. Resistivity measurements may be used to help in the estimation of the saturation parameters. Initial estimations may be used as the starting parameters for a full parameter inversion. An interpretation scheme in the absence of invasion details is provided.

16 Claims, 4 Drawing Sheets

(56) References Cited

OTHER PUBLICATIONS

Land, C. S., et al., "Calculation of Imbibition Relative Permeability for Two and Three-Phase Flow fom Rock Properties", Soc. Pet. Eng. J. 8(2), pp. 149-156, (1968).

Ramakrishnan, T.S., et al., "Eeffect of Capillary Number on the Relative Permeability Function for Two-Phase Flow in Pourous Media", Powder Technology 48 (1986) 99-124.

Ramakrishnan, T.S., et al., "A Laboratory Investigation of Permeability in Hemispherical Flow with Application to Formation Testers", SPE Formation Evaluation, Jun. 1995, pp. 99-108.

\* cited by examiner

METHODS FOR DETERMINING SATURATION PARAMETERS OF A FORMATION

TECHNICAL FIELD

The subject disclosure relates to methods for investigating an earth formation traversed by a borehole. More particularly, the subject disclosure relates to methods for determining saturation parameters of an earth formation utilizing pressure and water-cut measurements obtained from borehole tools.

BACKGROUND

In order to explore an earth formation for its potential of producing hydrocarbons, it is common to drill a borehole in the formation. During drilling, a drilling mud, which is often water-based, may be used to cool the drill bit, circulate cuttings to the surface, and control the pressure in the borehole. The drilling mud filtrate often invades the formation. After the borehole is drilled, tools such as the Schlumberger MDT (a trademark of Schlumberger) that are capable of extracting fluid samples from the formation are lowered into the borehole and placed into contact with the formation, and fluid may be withdrawn from the formation for analysis. Optical analysis of the fluid may be conducted by a fluid analyzer such as the Schlumberger CFA (a tademark of Schlumberger). In addition, while fluid is being produced from the formation (drawdown), the pressure at the probe may be measured and processed in order to determine formation parameters such as formation permeability. Likewise, at the completion of the withdrawal of fluid from the formation, the pressure build-up at the probe may be measured and processed in order to determine formation parameters such as fluid pressure and far-field permeability.

In general, the sampling process may be described by multiphase-multicomponent flow equations. The problem is complicated because the initial conditions for the sampling process is impacted by the details of the invasion process. While the invasion process is essentially cylindrical in nature, (see, Ramakrishnan, T. S. and Wilkinson, D. J., "Water-cut and Fractional-flow Logs from Array-Induction Measurements", *SPE Reservoir Eval. & Eng.* 2, pp. 85-94 (1999)), the sampling process is not. No straight-forward symmetry is possible unless simplifying assumptions are made. (see Hammond, P. S., "One- and Two-Phase Flow During Fluid Sampling by a Wireline Tool", *Trans. Porous Media* 6, pp. 299-330 (1991)).

In principle, the invasion problem may be parameterized in terms of multiphase flow properties and drilling conditions, and a simulation exercise may be carried out. Subsequently, the same properties may be used for modeling fluid sampling with a formation tester. The predicted fractional flow and pressures may be compared with the observed data and the "best-fit" parameters can be evaluated. Such a procedure however, is cumbersome and time consuming, and is beset with problems that have to do with uncertainties associated with the spatial distribution of formation properties such as permeability.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods are provided for determining saturation parameters of a formation while sampling the formation. In accordance with some embodiments, flow rate and pressure data are used in order to provide mobility information close to the probe. In turn, the mobility information is used in conjunction with at least water fraction information in order to provide an estimation of saturation parameters of the formation such as maximum residual oil saturation $S_{orm}$, connate water saturation $S_{wc}$, and residual water saturation $S_{wr}$. In some embodiments, resistivity measurements are used to help in the estimation of the saturation parameters. Initial estimations may be used as the starting parameters for a full parameter inversion. In one aspect, the embodiments provide an interpretation scheme in the absence of invasion details.

Additional aspects, embodiments, objects and advantages of the disclosed methods may be understood with reference to the following detailed description taken in conjunction with the provided drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 4:
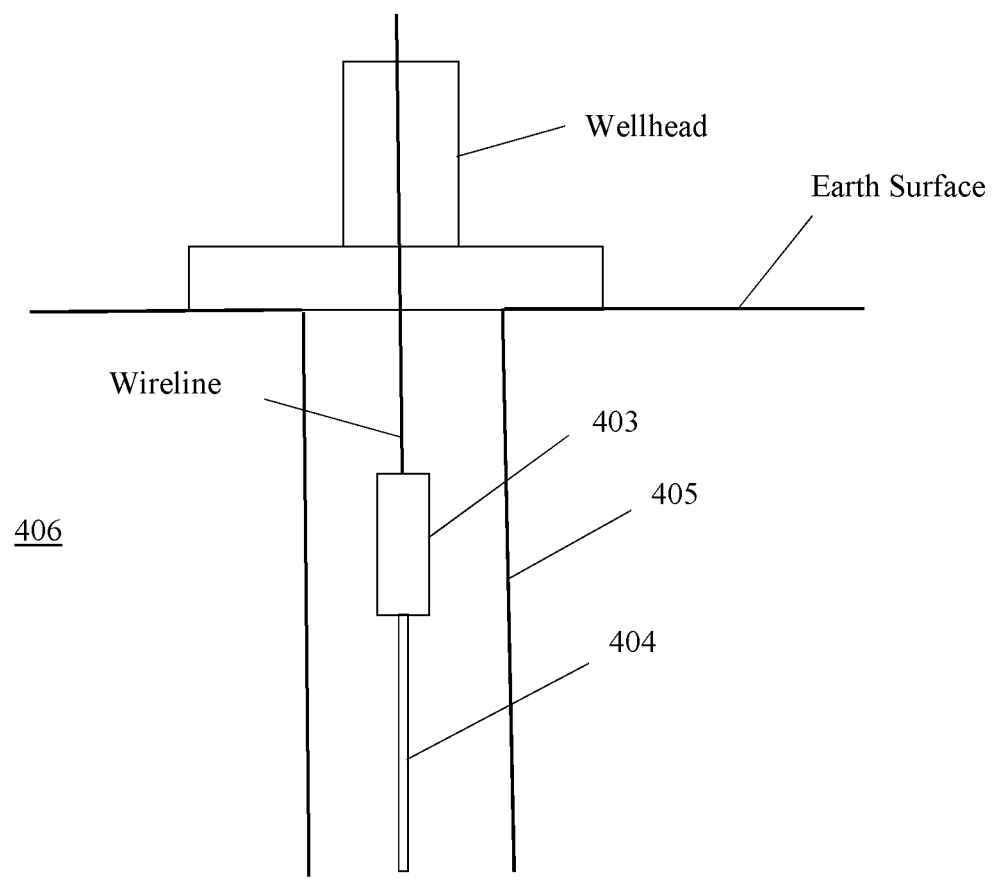
FIG. 4 shows a wellbore and a borehole tool at a location in the formation.
Figure 5:
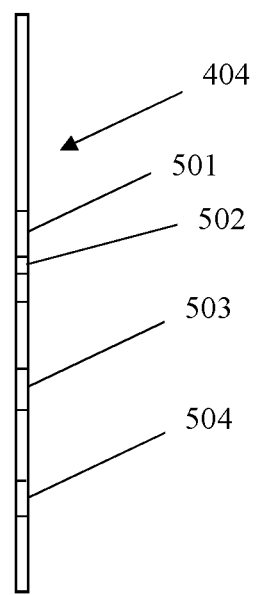
FIG. 5 shows a borehole tool having a probe, an optical fluid analyzer, a pressure sensor and a sample chamber.

An understanding of the theoretical underpinnings for the embodiments is useful. At the outset, certain simplifying assumptions may be set forth. First, in a downhole tool 403, as shown in FIGS. 4 and 5, used in a wellbore 405, such as the Schlumberger MDT that samples formation fluids by providing a sample chamber 502 at a lower pressure than the formation pressure, the pressure at the probe 404 is determined by the mobility of the formation 406 to formation fluids in the proximity of the probe 404. The probe 404 includes an optical fluid analyzer 503, a fluid sampling tool 501 having the sample chamber 502, and a pressure sensor 504. This is based on the result that the pressure decays inversely with the distance from the probe and the saturation/mobility variations away from the probe 404 are likely to cause higher order corrections. Related to this assumption is the presumption that close to the probe 404, no significant saturation variations occur. This is assumed to be the case both in the flow direction and orthogonal to it. Variation in saturation on length scales much larger than that of the probe size is allowed. It should be noted that in the analysis of Hammond, P. S., "One- and Two-Phase Flow During Fluid Sampling by a Wireline Tool", *Trans. Porous Media* 6, pp. 299-330 (1991), streamlines carrying different saturations arrive at the probe simultaneously and it might appear that the present assumption is invalid. However, in low permeability formations, capillary pressure tends to smoothen out significant variations in a direction orthogonal to flow. Also, in high permeability formations, the initial saturation distribution itself is smeared out by capillary pressure not accounted for in Hammond's analysis.

A second assumption relates to the sample chamber of the sampling tool and sets forth that the sample chamber air cushion may be described by the ideal gas law. This assumption is easily relaxed with a suitable equation of state.

A third assumption is that given the smallness of the ratio of probe radius to wellbore radius, it may be assumed that the drawdown steady-state relationship for hemispherical flow is valid between flowrate and pressure.

In one aspect, based on the above assumptions, and as set forth in Ramarkishanan, T. S., et al., "A laboratory investigation of permeability in hemispherical flow with application to formation testers", *SPE Form. Eval.* 10, pp. 99-108 (1995), a change in pressure from the original formation pressure $p_f$ is related to the flowrate at any instant of time $q(t)$, the fluid mobility at the probe $\lambda_p$, the probe opening radius $r_p$ and the measured pressure $p_t$ at the probe of the tool according to $$p_f - p_t = \frac{q(t)}{4\lambda_p r_p}. \quad (1)$$

It is noted that $\lambda_p$ is the mobility of the fluid close to the probe and may be defined according to $$\lambda_p = \lambda(S_p(t)), \quad (2)$$

where $S_p$ is the saturation at the probe which may change with time, and where the total mobility $\lambda$ is a function of saturation. Equation (2) assumes that there is no skin damage.

If it is assumed that the near-probe region is at a saturation $S_p$, then the pressure gradient in the oleic and aqueous phases are roughly the same. Therefore, the fractional flow of the aqueous phase into the tool $f_{wp}$ is given by the fractional flow relationship $$f_{wp} = \frac{\lambda_{wp}}{\lambda_{wp} + \lambda_{op}} = \frac{\lambda_{wp}}{\lambda_p}, \quad (3)$$

where the subscript p denotes values at the probe, the subscript w denotes the aqueous phase, and the subscript o denotes the oleic phase.

Since the pressure at the probe $p_t$ is measured, and the formation pressure $p_f$ is known, if the flow rate $q(t)$ is either known or can be determined (as discussed hereinafter with reference to equation (9)), the mobility at the probe $\lambda_p$ may be calculated from equation (1). Also, knowing the fractional flow, e.g., by using an optical analyzer such as the Schlumberger CFA to determine the aqueous phase fraction $f_{wp}$, the aqueous phase mobility $\lambda_{wp}$ may be calculated according to equation (3). Thus, a cross-plot of $\lambda_{wp}$ or the fractional flow $f_{wp}$ and $\lambda_p$ is possible.

Figure 1:
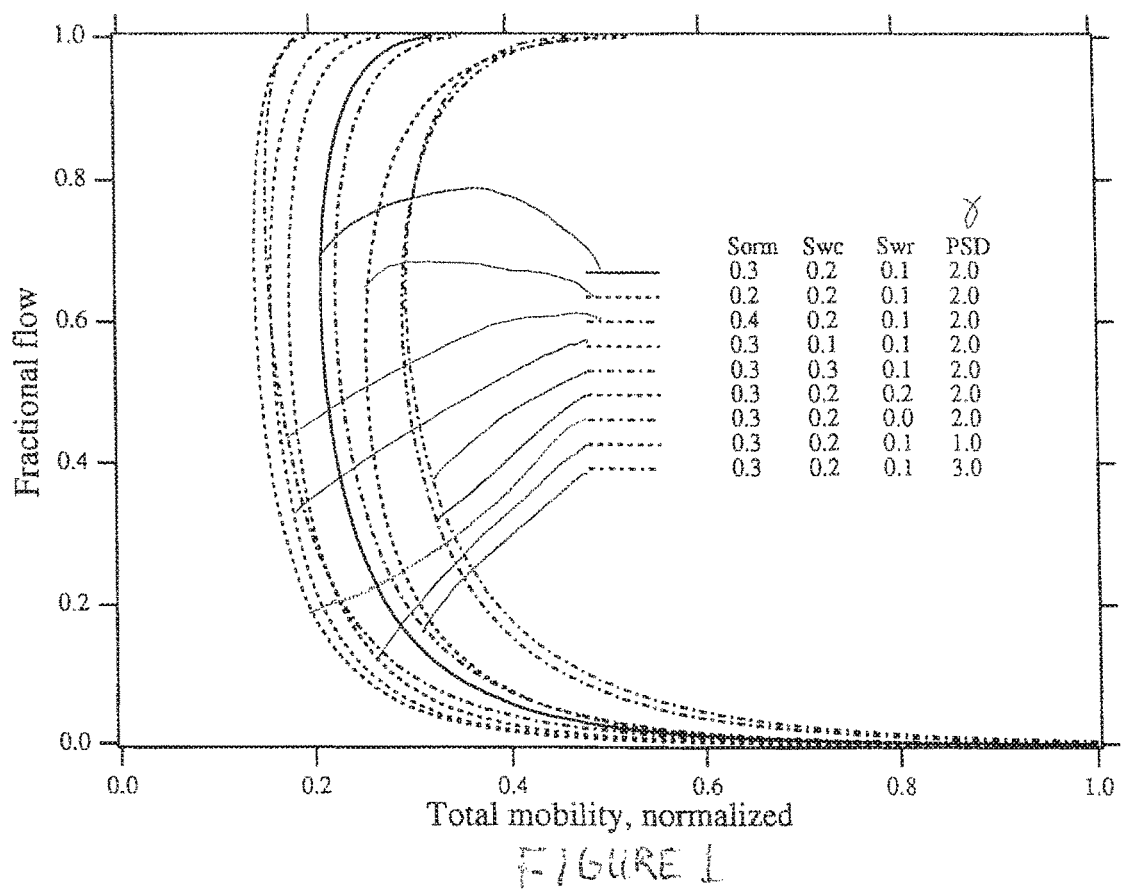
FIG. 1 is a cross-plot of fractional flow versus normalized total mobility as a function of maximum residual oil saturation $S_{orm}$, connate water saturation $S_{wc}$, residual water saturation $S_{wr}$, and pore size distribution index PSD.

In the model of Land, C. S., "Calculation of Imbibition Relative Permeability for Two and Three Phase Flow fom Rock Properties", $S_{or}$ c. Pet. Eng. J. 8(2), pp. 149-156 (1968) and in the model of Ramakrishnan, T. S. and Wasan, D. T., "Effect of Capillary Number on the Relative Permeability Function for Two-Phase Flow in Porous Media", *Powder Technol.* 48, pp. 99-124 (1986), a cross plot of $\lambda_{wp}$ or $f_{wp}$ and $\lambda_p$ is dependent on four parameters: maximum residual oil saturation $S_{orm}$, connate water saturation $S_{wc}$, residual water saturation $S_{wr}$, and pore size distribution index PSD or $\gamma$. An example of such a cross-plot is seen in FIG. 1 where they axis shows fractional flow (i.e., the aqueous phase divided by the total flow), the x axis shows a normalized total mobility (i.e., the total mobility $\lambda_p$ divided by the maximum total mobility as discussed hereinafter), and where nine different combinations of values for the four parameters are shown for different fractional flows and normalized total mobilities. Thus, four parameters may have to be estimated from such a cross-plot. To improve estimates, resistivity data may be used. More particularly, if near-field and far-field resistivity values are available, using conventional log-interpretation methods as described hereinafter, the residual oil saturation $S_{or}$ and the connate water saturation $S_{wc}$ may be estimated. Since $S_{or}$ depends on $S_{wc}$, $S_{orm}$ and $S_{wr}$ through the Land's relation (see, Land, C. S., "Calculation of Imbibition Relative Permeability for Two and Thre Phase Flow fom Rock Properties", $S_{or}$ c. Pet. Eng. J. 8(2), pp. 149-156 (1968)), two of the four parameters ($S_{orm}$ and $S_{wc}$) are known with some confidence and may be used in parameter estimation as described hereinafter.

Returning to equation (1), in order to determine the mobility at the probe, the flow rate $q(t)$ must be known or calculated. In some embodiments, the downhole tool is provided with a flow rate monitor that provides the flow rate of the fluid entering the probe. In some embodiments, the downhole tool is provided with pressure sensors, and the flow rate is determined from the measured pressures. More particularly, consider the filling of formation fluid into a sample chamber prefilled with gas, where a piston or a partition separates the gas from the formation fluid, and assume that both the gas pressure and the flowline pressure are available. Since the gas is completely enclosed, conservation of mass gives $$d(\rho_g V_g)/dt=0, \quad (4)$$

where $\rho_g$ and $V_g$ are respectively the gas density and the volume of the gas in the chamber. If the initial gas volume is $V_0$, then $$V_g = V_0 - \int_0^t q(\varsigma)d\varsigma \quad (5)$$

Also, the density may be described through an equation of state such as $$\rho_g = \frac{p_g M_g}{RT_g} \quad (6)$$

where $M_g$ is the molecular weight of the gas in the chamber. Substituting for $V_g$ and $\rho_g$ in equation (4), the following is obtained:

$$-q(t)p_g + \left[V_0 - \int_0^t q(\zeta)d\zeta\right]\frac{dp_g}{dt} = 0. \quad (7)$$

A constant temperature has been assumed for the gas. For non-isothermal compression, either the measured temperature or an isentropic compression may also be considered.

Since $p_g(t)$ may be measured with a pressure sensor connected to the gas side of the chamber, it may be assumed that $$\frac{1}{p_g}\frac{dp_g}{dt} = \chi(t)$$

may be regarded as a measured quantity. Defining the cumulative flow as $\int_0^t q(t)dt = Q_t$, a differential equation for $Q_t$ is obtained:

$$\chi(t)Q_t + \frac{dQ_t}{dt} = \chi(t)V_0 \quad (8)$$

Solving equation (8) yields $$q(t) = V_0 p_{g0}\frac{1}{p_g^2(t)} = p'_g(t) \quad (9)$$

where $p_{g0}$ is the initial gas pressure, $p_g$ is the measured gas pressure, and $p'_g$ is the derivative of the measured gas pressure with respect to time. Thus, the flowrate q(t) into the sample chamber may be computed from pressure measurements of the sample chamber over time and knowledge of volume $V_0$.

Turning to another aspect, as set forth above, equation (2) assumed no skin damage. One of the difficulties of examining the cross-plot between $\lambda_{wp}$ or $f_{wp}$ and $\lambda_p$ is that the results depend on the magnitude of the single phase permeability. Furthermore, any damage of the near probe area can alter the permeability with time, introducing another level of uncertainty. According to some embodiments, a modified analysis is provided where this effect may be removed as long as the skin factor does not change with time. In particular, consider the relationship between the probe pressure and the flowrate. Assuming hemispherical flow corrected for the presence of the probe, with an effective damage radius of rs and a damaged zone permeability of $k_s$, equation (1) may be rewritten according to $$p_f - p_t = \frac{q(t)}{4\lambda_p r_p}[1 + S_k] \quad (10)$$

where the skin factor $S_k$ is $$S_k = \left[\frac{k}{k_s} - 1\right]\left[1 - \frac{2r_p}{\pi r_s}\right]. \quad (11)$$

and k is the true permeability of the formation. It should be noted that $r_s$ is always greater than $2 r_p/\pi$. Thus, what is estimated to be the "measured" mobility ($\lambda_m$) is reduced by a factor of $1+S_k$ from the true value. The previously mentioned cross-plot of mobilities is therefore affected not only by the single-phase permeability, but also by the skin factor.

In accordance with some embodimnets, an example method of circumventing the effect of skin damage is to analyze the relative mobilities with respect to the maximum mobility. The measured or computed mobility as per equation (10) is $$\lambda_m = \frac{\lambda(S_p)}{1 + S_k}. \quad (12)$$

If it is asumed that the skin factor is due to the alteration of single phase permeability, but that the relative permeabilities remain unaffected, then the fractional flow of the aqueous phase $f_{wp}$ remains unaffected by a constant skin factor. As a result, $\lambda_{wp} = \lambda_m f_w$. If the maximum measured mobility is denoted as $\lambda_{m_{max}}$, then the normalized total mobility v is determined according to:

$$v = \frac{\lambda_m}{\lambda_{m_{max}}} = \frac{k_{rw}M + k_{ro}}{(k_{rw}M + k_{ro})_{max}}, \quad (13)$$

where M is the viscosity ratio of oil to water, and $k_{ro}$ and $k_{rw}$ are the relative permeabilities for the non-wetting (oil) and wetting (water) phases. It should be noted that equation (13) shows that the ratio of mobilities is independent of a constant skin factor and the single phase permeability. Furthermore, the left hand side of the equation is known from the pressure data. For reasonable viscosity ratios and in oil-zone or nearby, the maximum total mobility will be determined by $k_{ro}$ at $S_{wc}$.

Returning to FIG. 1, a number of dimensionless cross-plots are shown where the values for both axes are determinable from measured data. The illustration is for unit viscosity ratio and is meant to demonstrate the sensitivity of the cross-plot of the fractional flow and the mobility ratio as in equation (13) to the four parameters of interest: $S_{orm}$, $S_{wc}$, $S_{wr}$, and PSD ($\gamma$). The solid curve is for nominal values of the four parameters. The other curves represent changes in $S_{orm}$, $S_{wc}$, $S_{wr}$, and PSD from the nominal values and demonstrate sensitivity to each of them. In the cross-plot, values of fractional flow close to unity reflect $S_{or}$. As previously mentioned, values of the normalized total mobility approaching unity is representative of the native formation (in an oil zone).

In one aspect, various methods are possible for parameter estimation. In accordance with some embodiments, the curves of FIG. 1 may be used to estimate parameters related to two-phase relative permeabilities. In particular, by finding the fractional flow and the normalized total mobility for a location in the formation at points in time, points on the cross-plot are defined and may be used to estimate $S_{orm}$, $S_{wc}$, $S_{wr}$, and PSD by identifying a closest cross-plot curve. In some embodiments, because measurement sensitivity to PSD is weak with respect to pressure response and resistivity, a PSD of 2 may be assumed (which is a common value for clean sandstones) and cross-plot curves of different $S_{orm}$, $S_{wc}$, and $S_{wr}$ values with a PSD of 2 are generated. Then, at multiple points in time, by finding the fractional flow and the normalized total mobility for a location in the formation, points on the cross-plot are defined and may be used to estimate $S_{orm}$, $S_{wc}$, and $S_{wr}$.

In some embodiments, and as previously mentioned, auxiliary data such as those from a resistivity tool may be used to constrain $S_{or}$ and $S_{wc}$. Then, using the cross-plot and with an assumed PSD value, and with fractional flow and normalized total mobility values, $S_{wr}$ can be estimated. More particularly, a complete set of functional forms for relative permeabilities are available from Ramakrishnan, T. S. and Wasan, D. T., "The Relative Permeability Function for Two-Phase Flow in Porous Media: Effect of Capillary Number," *Powder Technol.* 48 pp. 99-124 (1986), and relative permeabilities are shown to be computable, provided values of $S_{wc}$, $S_{wr}$, $S_{orm}$ and PSD are given. Since PSD may be fixed to a value of 2.0, parameter inversion is conducted using the three remaining quantities, although the methodology may also be applied when the PSD is assumed unknown. Initial guesses are obtained from resistivity logs which provide values for $S_{or}$ (as opposed to $S_{orm}$) and $S_{wc}$. For example, $S_{or}$ may be estimated from a near wellbore log of $R_{xo}$ obtained from a microresistivity logging tool that generates logs such as the MSFL (microresistivity spherically focused log) or MCFL (microresistivity cylindrically focused log) microresistivity logs which are trademarks of Schlumberger, while $S_{wc}$ may be deduced from the deepest resistivity log of $R_t$ obtained from tools such as the DIL (deep induction log) and DLL (deep laterolog) tools which are trademarks of Schlumberger.

The three parameters of the relative permeability curves (ignoring PSD) may then be related to the estimations of $S_{or}$ and $S_{wc}$ using Land's relationship according to $$S_{or}^* = \frac{1 - S_{wc}^*}{1 + \left(\frac{1}{S_{orm}^*} - 1\right)(1 - S_{wc}^*)} \quad (14)$$

where $S_{or}^* = S_{or}/(1-S_{wr})$ and $S_{wc}^* = (S_{wc}-S_{wr})/(1-S_{wr})$. Knowing $S_{orm}$, $S_{wr}$, and $S_{wc}$, a calculation for $S_{or}$ is evident. More notably, however, knowing $S_{or}$, and $S_{wc}$, a value for $S_{orm}$ may be calculated for a given value of $S_{wr}$ by: (a) estimating $S_{or}$, and $S_{wc}$, from $R_{xo}$ and $R_t$, (b) assuming $S_{wr}$, (c) calculating $S_{or}^*$ and $S_{wc}^*$, (d) calculating $S_{orm}^*$ using equation (14), and (e) finding $S_{orm}$ according to $S_{orm}^*(1-S_{wr})=S_{orm}$. Thus for an assumed value of $S_{wr}$, the variables $S_{orm}$ and $S_{wc}$ are known and relative permeabilities can be calculated. This is valid for any value of PSD, and therefore is applicable regardless of whether PSD is fixed a priori or not.

Figure 2:
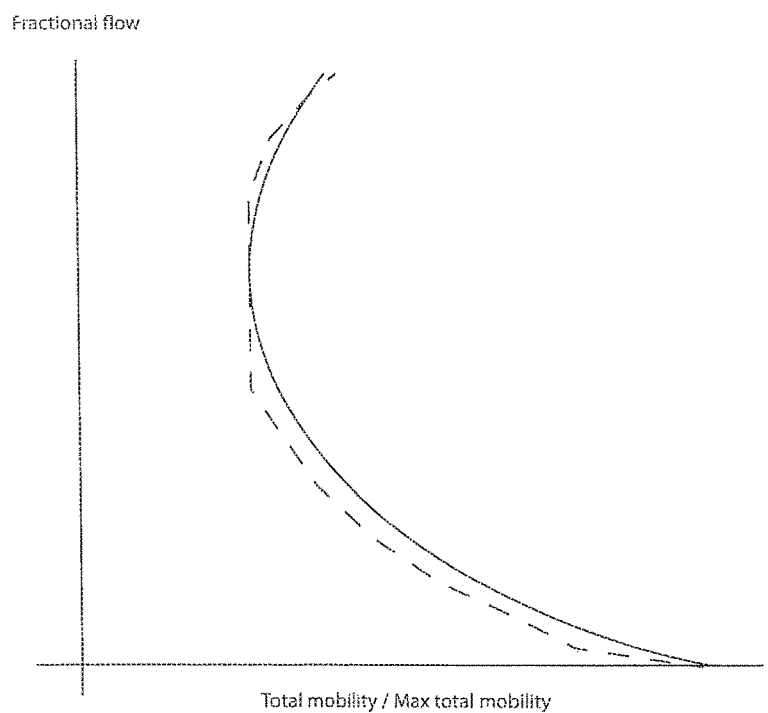
FIG. 2 is a cross-plot comparing theoretical determinations of fractional flow versus normalized total mobility with measured determinations.

In accordance with some embodiments, assuming that the water fraction $f_w$ and the normalized total mobility v are known, and estimates for $S_{wc}$ and $S_{or}$ are fixed based on resistivity measurements $R_t$ and $R_{xo}$, an iterative loop for $S_{wr}$ may be constructed, e.g., from values 0.0 to 0.5 in steps of, e.g., 0.1. For each value of $S_{wr}$, using the $S_{wc}$ and $S_{or}$ estimates, $S_{orm}$ is calculated. Then, for each measured value of $f_w$, the variable $S_w$ can be calculated according to:

$$f_w = \frac{k_{rw}(S_w)/\mu_w}{\left(\frac{k_{rw}(S_w)}{\mu_w}\right) + \frac{k_{ro}(S_w)}{\mu_o}} \quad (15)$$

where $k_{ro}$ and $k_{rw}$ are the relative permeabilities for the non-wetting (oil) and wetting (water) phases, and the values are the corresponding viscosities. Thus, knowing $f_w$ means knowing $S_w$. The maximum mobility in a two phase system is at the maximum value of $k_{rw}/\mu_w+k_{ro}/\mu_o$. Thus, for each $S_w$, by computing equation (13), a theoretical curve of $(f_w,v)$ pairs can be generated. In FIG. 2, the theoretical curve is shown as a solid line. Then, measured pairs (as shown by the dotted line in FIG. 2) which provide discrete points which define lines or a curve, can be compared to the theoretical pairs and the difference may be used as an error estimate. By comparing the measured curve to a plurality of theoretical curves generated from the plurality of discrete values of $S_{wr}$, the value of $S_{wr}$ for which the error measured by the area between the two curves is minimized can be selected as the determined value. Minimization of the area between the measured curve $(f_w,v)$ and the estimated curve may be conducted through an optimization algorithm. The terminal points of the curves, which correspond to the largest and smallest values of $f_w$, may be connected by straight lines in order to estimate the area between the curves.

For final estimation of parameters, in accordance with some embodiments, an optimization algorithm for minimizing the area between the measured and the model computed $(f_w,v)$ curve is conducted by adjusting the parameters $S_{wr}$, $S_{wc}$, $S_{orm}$ (and, if necessary, PSD) which are the parameterization values. For each $f_w$ measured $(f_{wp})$, an inversion is conducted for $S_w$ and a corresponding value of v is calculated according to equation (13) for a given set of parameterization values. Similarly, (model-) predicted values for $R_w$ and $R_t$, the near wellbore and far-field resistivities, are calculated using an Archie-like expression from $S_{wc}$ and $S_{or}$. If, for example, clays are present, a suitable clay-effect corrected saturation equation such as that of Waxman-Thomas (1974) may be adequate for calculating resistivities. Thus, the area between the two curves (as in the initialization process) and the square of the error between the model resistivities and the measured values may be calculated. The total error may be specified by the summing the two values with appropriate weights for the two. Since the area between the $(f_w,v)$ curves is dimensionless, in accordance with some embodiments, the resistivity data is normalized by (i) computing errors in terms of conductivities and normalizing the differences between the measured and computed conductivities with respect to the measured conductivity itself, (ii) squaring them and (iii) then adding them to the area measurement. Additional weighting for the area between the $(f_w,v)$ curves and the normalized conductivity error may also be considered. For example, if weighting flow and conductivity data on an equal footing is desired, a weight of ½ for the area and ¼ for each of the conductivity points can be assigned. Any of the standard methods given by Press, W. H., et al., *Numerical Recipes in FORTRAN*, Cambridge Univ. Press, New York (1992) may be applied for optimization purposes.

In accordance with some embodiments, it is appreciated that for each $f_w$ there is a corresponding water saturation as suggested in equation (15). Thus, a single value for total mobility (or normalized total mobility) exists for each $f_w$. Therefore, in an iterative scheme, values for each of $S_{orm}$, $S_{wc}$, $S_{wr}$, and PSD are estimated. For each $f_w$ measured $(f_{wp})$, an inversion is conducted for $S_w$ and a corresponding value of v is calculated according to equation (13) and the estimates of the parameters $S_{orm}$, $S_{wc}$, $S_{wr}$, and PSD. Similarly, (model-) predicted values for normalized conductivities from $R_{xo}$ and $R_t$, the near wellbore and far-field resistivities, are calculated as stated previously. Then, using for example an Archie-type or Waxman-Thomas saturation equation or equations of similar ilk, a $\chi^2$ error is constructed between the measured values of v, $R_{xo}$ and $R_t$, and normalized conductivities corresponding to the parameters chosen. An iterative correction using, e.g., any of the standard methods given by Press, W. H., et al., *Numerical Recipes in FORTRAN*, Cambridge Univ. Press, New York (1992) for a least-squares based parameter estimation may be applied, resulting in determinations of values for each of $S_{orm}$, $S_{wc}$, $S_{wr}$, and PSD. It will be appreciated that no prior knowledge about the details of the invasion process is required, and only sampling tool measurements and resistivity logs are used. It will also be appreciated that the procedure may be used even if one or more resistivity logs are unavailable or faulty by relying solely on the measured pressure and fractional flow within the tool.

Figure 3:
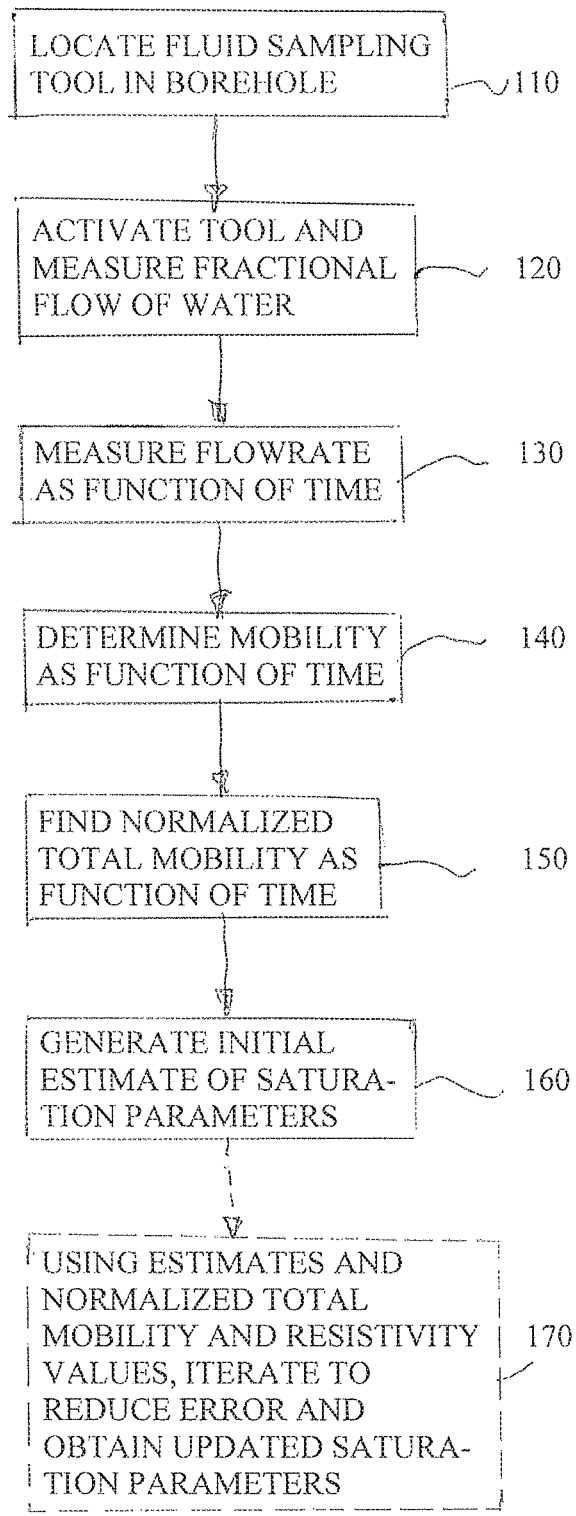
FIG. 3 is a flow chart of a method of determining saturation parameters of a formation.

Turning to FIG. 3, one method of determining saturation parameters of a formation is provided in flow-chart form. At 110, a fluid sampling tool is located in a borehole traversing a formation. At 120, the fluid sampling tool (such as, for example, the optical fluid analyzer—OFA of Schlumberger) is activated and the fractional flow of water within tool is measured as a function of time (e.g., at multiple points in time). At 130, the flowrate of the fluid in the tool is measured as a function of time. The measuring of the flowrate may be accomplished either by locating a flow meter in the sampling tool or by measuring pressures within the gas side of the sample chamber as discussed above with reference to equation (9), and/or by other desired methods. If the flowrate is measured at a location different than the location of the fractional flow measurement, the data associated with the flowrate is shifted in time to match in time the fractional flow determination. At 140, using the flowrate information, the measured probe pressure can be converted to the measured mobility using equations (10) and (12) resulting in a mobility-fractional flow couplet (pair) for each time sample. Then, at 150, the normalized total mobility v is determined according to equation (13) by finding the maximum measured mobility and dividing the measured mobility by that maximum value. As a result, normalized total mobility—fractional flow couplets (pairs) are obtained. The normalized total mobility is independent of the skin factor, as long as the skin factor is assumed to be a constant. At 160, the fractional flow and normalized total mobility couplets may be cross-plotted and compared with curves of FIG. 1 in order to provide an initial estimate of at least one saturation parameters of the formation. The initial estimate may be an estimate of one or more of $S_{orm}$, $S_{wc}$, and $S_{wr}$ values. In addition, a PSD value may be estimated. Alternatively or additionally, the couplets may be compared with charts of data that represent cross-plot curves in order to provide an initial estimate of the one or more saturation parameters of the formation. If desired, one or more of the saturation parameters may be estimated by utilizing resistivity interpretation, thereby further constraining the problem and providing a better initial estimate determination of $S_{wr}$. If desired, a PSD value may be estimated or assumed. In accordance with some embodiments, at 170, if desired, using the initial estimates for the saturation parameters (and PSD), for each $f_w$ measured ($f_{wp}$), an inversion is conducted for $S_w$ and a corresponding value of v is calculated. Using the resistivity determinations as well as v, the error between the measured values of v, and normalized conductivities, the estimated values corresponding to the parameters chosen is found, and an iterative correction may be conducted in order to determine modified values for each of $S_{orm}$, $S_{wc}$, $S_{wr}$, and PSD.

In one aspect, some of the methods and processes described above, such as locating a maximum measured mobility, calculating normalized mobilities, conducting multi-parameter estimates using constraint values, calculating flow rates from pressure readings, etc., are performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, FORTRAN, Python, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe particular tools for finding fractional flow and flow rates, it will be appreciated that other tools may be utilized. Also, while various apparatus and methods for finding fluid flow rates have been described, it will be appreciated that other apparatus and methods could be utilized. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of determining a saturation parameter of a formation traversed by a borehole, comprising:

locating a borehole tool at a location in the formation, said borehole tool having a probe connected thereto, the probe including a fluid sampling tool;

activating the fluid sampling tool thereby drawing formation fluid into a sample chamber of the fluid sampling tool, and measuring a fractional flow rate of the fluid in the borehole tool, and thereby generating fractional flow rate data;

based on said fractional flow rate data, by way of computer processing, calculating indication of fluid mobility data proximate to the probe; and based on said fractional flow rate data and said indication of fluid mobility data, by way of computer processing, calculating a saturation parameter of the formation.

2. The method of claim 1, wherein: the saturation parameter comprises at least one selected from the following list comprising: residual oil saturation $S_{orm}$, connate water saturation $S_{wc}$, and residual water saturation $S_{wr}$.

3. The method of claim 2, wherein: said fluid sampling tool includes an optical fluid analyzer and said measuring of the fractional flow rate of fluid comprises using said optical fluid analyzer to generate data that is then used to compute, by way of computer processing, said fractional flow rate data.

4. The method of claim 2, wherein: said fluid sampling tool includes a pressure sensor and said determining of the flow rate comprises calculations with a computer processor utilizing data obtained by the pressure sensor.

5. The method of claim 4, wherein: said determining of the flow rate comprises determining the flow rate into the sample chamber according to $$q(t) = V_0 p_{g0} \frac{1}{p_g^2(t)} p'_g(t),$$

where q(t) is the flow rate, $P_{g0}$ is an initial gas pressure in said sample chamber, $p_g$ is a measured gas pressure in said sample chamber, $p'_g$ is a derivative of the measured gas pressure with respect to time, and $V_0$ is the volume of the sample chamber.

6. The method of claim 2, wherein: said determining of the indication of fluid mobility comprises determining said indication of fluid mobility according to $$p_f p_t = \frac{q(t)}{4\lambda_p r_p}.$$

where $p_f$ is an original formation pressure, $p_t$ is a pressure measured at the probe, $q_{(t)}$ is the flowrate at any instant of time, $\lambda_p$ is the fluid mobility at the probe, and $r_p$ is a probe opening radius.

7. The method of claim 2, wherein: said calculating the saturation parameter comprises using pairs of time-related indications of said fractional flow rate and said fluid mobility and comparing said pairs of time-related indications to theoretical values of fractional flow rate and fluid mobility obtained as a function as a function of said saturation parameter.

8. The method of claim 7, wherein: said comparing said pairs comprises plotting said indications of said pairs of time-related indications on a cross-plot of fractional flow rate and an indication of fluid mobility.

9. The method of claim 7, wherein: said indication of fluid mobility is a normalized total mobility.

10. The method of claim 9, wherein: said normalized total mobility v is determined according to $$v = \frac{\lambda_m}{\lambda_{m_{max}}} = \frac{k_{rw}M + k_{ro}}{(k_{rw}M + k_{ro})_{max}},$$

where $\lambda_m$ is a measured or determined mobility, $\lambda_{m_{max}}$ is a maximum measured or determined mobility, M is a viscosity ratio of oil to water, and $k_{ro}$ and $k_{rw}$ are relative permeabilities for non-wetting (oil) and wetting (water) phases.

11. The method of claim 9, wherein: said theoretical values are a function of residual oil saturation $S_{orm}$, connate water saturation $S_{wc}$, and residual water saturation $S_{wr}$ and pore size distribution index PSD, and said comparing comprises finding a difference between said pairs and said theoretical values by adjusting values for said $S_{wr}$, $S_{wc}$, and $S_{orm}$, and PSD.

12. The method of claim 7, wherein: said comparing comprises finding a difference between said pairs and said theoretical values.

13. The method of claim 7, wherein: said theoretical values are a function of residual oil saturation $S_{orm}$, connate water saturation $S_{wc}$, and residual water saturation $S_{wr}$ and pore size distribution index PSD.

14. The method of claim 13, wherein: said PSD is assumed to be a particular value.

15. The method of claim 13, wherein: said theoretical values of $S_{orm}$ and $S_{wc}$ are derived from resistivity measurements taken at said location.

16. The method of claim 15, wherein: said PSD is assumed to be a particular value.

* * * * *